US009557223B2

(12) United States Patent
Mazumder et al.

(10) Patent No.: US 9,557,223 B2
(45) Date of Patent: Jan. 31, 2017

(54) MACH-ZEHNDER INTERFEROMETER HAVING A DOUBLY-CORRUGATED SPOOFED SURFACE PLASMON POLARITON WAVEGUIDE

(71) Applicant: The Regents of The University of Michigan, Ann Arbor, MI (US)

(72) Inventors: Pinaki Mazumder, Ann Arbor, MI (US); Zhao Xu, Ann Arbor, MI (US); Kyungjun Song, Ann Arbor, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 156 days.

(21) Appl. No.: 14/315,933

(22) Filed: Jun. 26, 2014

(65) Prior Publication Data

US 2015/0330838 A1 Nov. 19, 2015

Related U.S. Application Data

(63) Continuation-in-part of application No. 12/842,997, filed on Jul. 23, 2010, now Pat. No. 8,837,036.

(60) Provisional application No. 61/840,767, filed on Jun. 28, 2013.

(51) Int. Cl.
*G01J 9/02* (2006.01)
*G02B 6/122* (2006.01)
*G02B 6/12* (2006.01)

(52) U.S. Cl.
CPC ............... *G01J 9/02* (2013.01); *G02B 6/1226* (2013.01); *G01J 2009/0288* (2013.01); *G02B 2006/12159* (2013.01); *G02F 2202/30* (2013.01); *G02F 2203/10* (2013.01); *G02F 2203/13* (2013.01)

(58) Field of Classification Search
CPC .......... G02F 1/365; G02F 1/011; G02F 1/313; G02F 2203/10; G02F 2203/13; G02F 2202/30; B82Y 20/00; G02B 6/1226; G02B 6/125; G02B 6/3596
USPC ....... 359/245, 247, 254, 315, 318, 320–322, 359/900; 372/26
See application file for complete search history.

(56) References Cited

U.S. PATENT DOCUMENTS

| | | | |
|---|---|---|---|
| 6,542,682 B2 | 4/2003 | Cotteverte et al. |
| 7,116,864 B2 | 10/2006 | Yanik et al. |
| 7,663,107 B2 | 2/2010 | Taday |
| 7,709,247 B2 | 5/2010 | Koo et al. |
| 8,111,443 B1 | 2/2012 | Russell et al. |

(Continued)

OTHER PUBLICATIONS

Xu, et al "Bio-Sensing by Mach-Zehnder Interferometer Comprising Doubly-Corrugated Spoofed Surface Plasmon Polariton (DC-SSPP) Waveguide", IEEE Transactions on Terahertz Science and Technology, vol. 2, No. 4 (Jun. 26, 2012).

(Continued)

*Primary Examiner* — Mahidere Sahle
(74) *Attorney, Agent, or Firm* — Harness, Dickey & Pierce, PLC (57) ABSTRACT

A Mach-Zehnder interferometer (MZI) structure based on a doubly-corrugated spoofed surface plasmon polariton (DC-SSPP) waveguide is presented. The dependence of phase change on the dielectric loading of the DC-SSPP structure causes the output from both arms to interfere and enhance features on the transmission spectrum of the MZI. The proposed MZI structure can be used for tag-free bio-molecular sensing. The highly localized electro-magnetic field at frequencies close to SSPP resonance is shown to reduce the sample amount needed to produce interference patterns without affecting the selectivity of the sensing structure.

9 Claims, 7 Drawing Sheets

(56) References Cited

U.S. PATENT DOCUMENTS

2006/0109541 A1    5/2006   Osipov et al.
2009/0262766 A1   10/2009   Chen et al.
2012/0019901 A1    1/2012   Mazumder

OTHER PUBLICATIONS

Xu, et al "Analysis of Doubly Corrugated Spoofed Surface Plasmon Polariton (DC-SSPP) Structure with Sub-Wavelength Transmission at THz Frequencies", IEEE Transactions on Terahertz Science and Technology vol. 2, Issue 3, pp. 345-354, (May 2012).
A. Rahman et al's "Ultrasensitive Label-Free Detection and Quantitation of DNA Hybridization Via Terahertz Spectrometry", Conference on Imaging Manipulation, and Analysis of Biomolecules, Cells and Tissues VIII, (Jan. 2010).

MACH-ZEHNDER INTERFEROMETER HAVING A DOUBLY-CORRUGATED SPOOFED SURFACE PLASMON POLARITON WAVEGUIDE

CROSS-REFERENCE TO RELATED APPLICATIONS

This application is a continuation-in-part of U.S. patent application Ser. No. 12/842,997 filed on Jul. 23, 2010, This application claims the benefit of U.S. Provisional Application No. 61/840,767 filed on Jun. 28, 2013. The entire disclosure of each of the above applications is incorporated herein by reference.

GOVERNMENT CLAUSE

This invention was made with government support under W911NF-10-1-0229 and W911NF-11-1-0024 awarded by the U.S. Army / Army Research Office. The Government has certain rights in the invention.

FIELD

The present disclosure relates generally to bio-sensing using an interferometer and, more particularly, a Mach-Zehnder Interferometer having a doubly-corrugated spoofed surface plasmon polariton waveguide.

BACKGROUND

Terahertz elements and devices designed to work in the frequency range of 0.1-10 THz have attracted enormous research activities in the past decade or so due to its potential use in applications such as astronomical remote sensing, tag-free bio-molecular detection, and monitoring of harmful chemicals. Intensive studies on the generation, transmission and detection mechanisms of THz signals also demonstrated the possibility of building integrated circuits in THz frequency range, which is known to have broader bandwidth than the operating frequency range of the current-generation VLSI devices and circuits. A major hurdle encountered by designers of THz logic components is how to realize low-loss and low dispersion transmission of electromagnetic signals. One way to overcome the problem is to introduce periodic surface features such as holes, grooves, and dimples onto the material interface of the structure, which generates a special surface mode known as the Spoofed Surface Plasmon Polariton (SSPP). Such pseudo mode mimics the common optical surface plasmon mode traveling at dielectric-metal interface, and therefore has a similar mode profile with strongly confined E-M field and localized energy distribution.

By introducing one-dimensional (1-D) periodic grooves on opposite interfaces of metal-dielectric-metal waveguides, a doubly-corrugated SSPP (DC-SSPP) structure can be realized. Previous work has provided extensive theoretical study along with computer simulations to demonstrate the existence of discrete transmission bands as well as SSPP modes with close-to-zero group velocity in such DC-SSPP structures. It has also been shown that the spectral response of DC-SSPP structures strongly depends on the geometrical dimensions and the choice of building materials. As a result, a number of passive and active SSPP components such as frequency filters and Boolean switches have been proposed and the related research work has been reported in other publications.

A common issue in the design of THz components is to achieve better spectral selectivity in the form of sharper transmission peaks. Higher sensitivity to the structural change caused by external stimuli is also preferred in the design of sensors and active components alike. In this disclosure, an interferometer design is proposed which combines two arms of the DC-SSPP structure together to form a Mach-Zehnder interferometer (MZI). While the MZI structure is often used in other scenarios to realize signal controls based on phase delay, with the help of DC-SSPP structure this structure is applied to the terahertz frequency domain.

This section provides background information related to the present disclosure which is not necessarily prior art.

SUMMARY

This section provides a general summary of the disclosure, and is not a comprehensive disclosure of its full scope or all of its features.

A Mach-Zehnder interferometer (MZI) structure based on a doubly-corrugated spoofed surface plasmon polariton (DC-SSPP) waveguide is presented. The interferometer includes: an input configured to receive an input electromagnetic (E-M) wave having a frequency on the order of one terahertz; a first arm extending from the input and configured to guide a spoofed surface plasmon polariton (SSPP) wave; a second arm extending from the input in parallel with the first arm and configured to guide a spoofed surface plasmon polariton (SSPP) wave, where the SSPP waves propagates at a speed slower than the input E-M wave; and an output configured to receive the SSPP waves from each of the first arm and the second arm and form an interference wave therein.

In one aspect, the MZI structure is further defined as a metal structure having a top surface, a bottom surface, two side surfaces, and two opposing end surfaces. An input channel is defined in a first end surface and configured to receive an input electromagnetic (E-M) wave traveling at a given frequency. An output channel is defined in a second end surface facing the first end surface. An upper channel is defined in the metal structure and interconnected between the input channel and the output channel. A plurality of grooves are formed in an inner surface of the upper channel at a periodic interval such that a first subset of the plurality of grooves extends towards the top surface of the metal structure and a second subset of the plurality of grooves extends towards the bottom surface of the metal structure. A lower channel is defined in the metal structure and interconnected between the input channel and the output channel. A plurality of grooves are also formed in an inner surface of the lower channel at a periodic interval such that a first subset of the plurality of grooves extends towards the top surface of the metal structure and a second subset of the plurality of grooves extends towards the bottom surface of the metal structure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
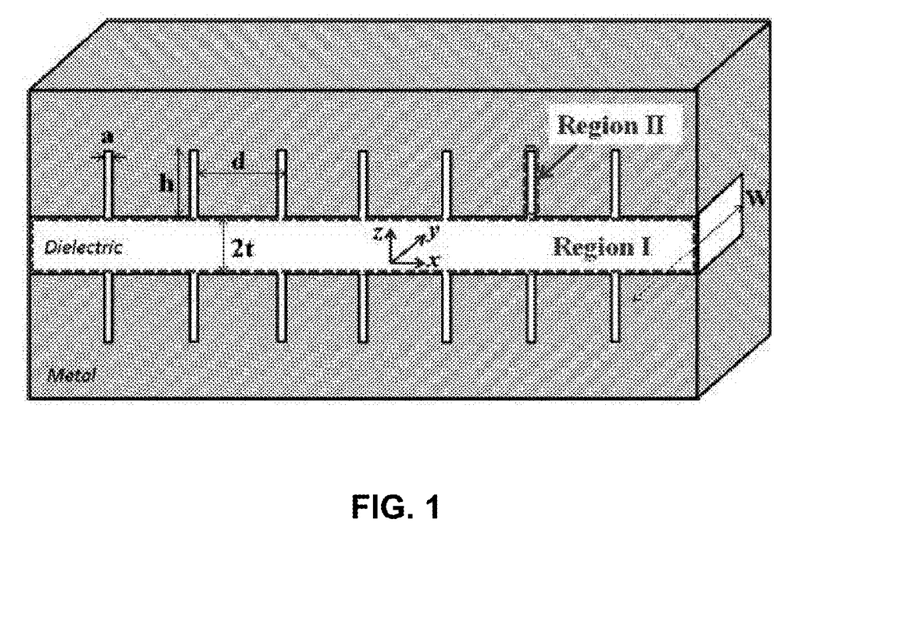
FIG. 1 is a cross-sectional view of a single-armed doubly-corrugated spoofed surface plasmon polariton waveguide structure.

FIG. 1 illustrates an example doubly-corrugated spoofed surface plasmon polariton (DC-SSPP) structure. In order to derive the mathematical form of the dispersion relation, such structure is divided into two regions. Region I is the main waveguide cavity without corrugations; whereas, Region II represents the periodic groove areas. Mirror symmetry of the structure dictates the modes to be either symmetric or anti-symmetric along the z-axis. The x-component of the mode, on the other hand, is best expressed by Floquet mode expansions due to the periodic nature of the waveguide. With these considerations, for the symmetric mode, the EM fields within the two regions (Region I and Region II) are expressed below.

In Region I $$\begin{matrix} H_x^I \\ H_y^I \\ H_z^I \end{matrix} = \sum_{n=-\infty}^{\infty} \rho_n e^{jk_{x,I}^{(n)}x} \begin{bmatrix} j\frac{k_y k_{x,I}^{(n)}}{v_y^2}\cos(k_y y)\cos(k_{z,I}^{(n)}z) \\ \sin(k_y y)\cos(k_{z,I}^{(n)}z) \\ -\frac{k_y k_{x,I}^{(n)}}{v_y^2}\cos(k_y y)\sin(k_{z,I}^{(n)}z) \end{bmatrix} \quad (1)$$

$$\begin{matrix} E_x^I \\ E_y^I \\ E_z^I \end{matrix} = \frac{1}{\omega\epsilon}\frac{k_0^2}{v_y^2}\sum_{n=-\infty}^{\infty} \rho_n e^{jk_{x,I}^{(n)}x}\sin(k_y y)\begin{bmatrix} jk_y k_{x,I}^{(n)}\sin(k_{z,I}^{(n)}z) \\ 0 \\ -k_{x,I}^{(n)}\cos(k_{z,I}^{(n)}z) \end{bmatrix} \quad (2)$$

In Region II $$\begin{matrix} H_x^{II} \\ H_y^{II} \\ H_z^{II} \end{matrix} = \begin{bmatrix} -\frac{k_y k_{x,II}}{v_y^2}(A^+e^{jk_{z,II}z} + A^-e^{jk_{z,II}z})\cos(k_y y)\sin(k_{x,II}x) \\ (A^+e^{jk_{z,II}z} + A^-e^{jk_{z,II}z})\sin(k_y y)\cos(k_{x,II}x) \\ j\frac{k_y k_{z,II}}{v_y^2}(A^+e^{jk_{z,II}z} - A^-e^{jk_{z,II}z})\cos(k_y y)\cos(k_{x,II}x) \end{bmatrix} \quad (3)$$

$$\begin{matrix} E_x^{II} \\ E_y^{II} \\ E_z^{II} \end{matrix} = \frac{1}{\omega\epsilon}\frac{k_0^2}{v_y^2}\sin(k_y y)\begin{bmatrix} k_{z,II}(A^+e^{jk_{z,II}z} - A^-e^{jk_{z,II}z})\cos(k_{x,II}x) \\ -jk_{x,II}(A^+e^{jk_{z,II}z} + A^-e^{-jk_{z,II}z})\sin(k_{x,II}x) \end{bmatrix} \quad (4)$$

In the above descriptions, a, d, h, t, W are different geometrical dimensions of the structure, as shown in FIG. 1. Specifically, a is the width of a groove, d is the periodic interval or distance between the grooves, h is height of a groove, $2t$ is the thickness of the waveguide along the z-axis and W is the dimension of the waveguide along the y-axis. $k_{x,I}^{(n)}$ and $k_{z,I}^{(n)}$ denote the wavevectors of the nth-order Floquet mode along x- and z-axis in Region I, and $\rho_n$ signifies its amplitude coefficient. Correspondingly, $k_{x,II}$ and $k_{z,II}$ denote the wave vectors along the two axis in Region II. Other variables are defined as follows:

$$v_y^2 = k_0^2 - k_y^2 = (k_{x,I}^{(n)})^2 + (k_{z,I}^{(n)})^2 \text{ in Region I}$$

$$v_y^2 = k_0^2 - k_y^2 = k_{x,II}^2 + k_{z,II}^2 \text{ in Region II}$$

$$k_y = \frac{m\pi}{W}, \quad m = 1, 2, \ldots$$

$$k_{x,II} = \frac{l\pi}{a}, \quad l = 0, 1, 2, \ldots$$

Across the boundary between Regions I and II, the E-M fields must be continuous. By Equating $E_x$ and $H_y$ in the two regions and integrate both sides of the two equations along one period of the structure, the following equation is derived:

$$-j\sum_{n=-\infty}^{\infty}\frac{k_{z,II}}{k_{z,I}^{(n)}}\frac{|T_n|^2}{\tan(k_{z,I}^{(n)}t)}(B^+ - B^-) = (B^+ + B^-) \quad (5)$$

where $$|T_n|^2 = \left|\sqrt{\frac{1}{ad}}\int_0^a e^{jk_{x,I}^{(n)}x}dx\right|^2 = \frac{a}{d}\left|\text{sinc}\left(\frac{k_{x,I}^{(n)}}{2}\right)a\right|^2 \quad (6)$$

$$B^+ = A^+e^{jk_{z,II}t}, \quad B^- = A^-e^{-jk_{z,II}t} \quad (7)$$

The tangential E field must vanish at the bottom of the groove. Therefore, from (4)

$$B^+e^{jk_{z,II}h} - B^-e^{-jk_{z,II}h} = 0 \quad (8)$$

By combining (5) and (8), a matrix equation for $[B^+, B^-]^T$ is obtained. For it to have non-trivial solutions, the determinant of the matrix must be zero. The dispersion relation can be hence obtained as below:

$$1 + \sum_{n=-\infty}^{\infty}\frac{k_{z,II}}{k_{z,I}^{(n)}}\frac{|T_n|^2}{\tan(k_{z,I}^{(n)}t)}\tan(k_{z,II}h) = 0 \quad (9)$$

Following a similar procedure, the dispersion relation of the anti-symmetric mode can be derived to be:

$$1 - \sum_{n=-\infty}^{\infty} \frac{k_{z,II}}{k_{z,I}^{(n)}} |T_n|^2 \tan(k_{z,I}^{(n)} t) \tan(k_{zII} h) = 0 \qquad (10)$$

Figure 2:
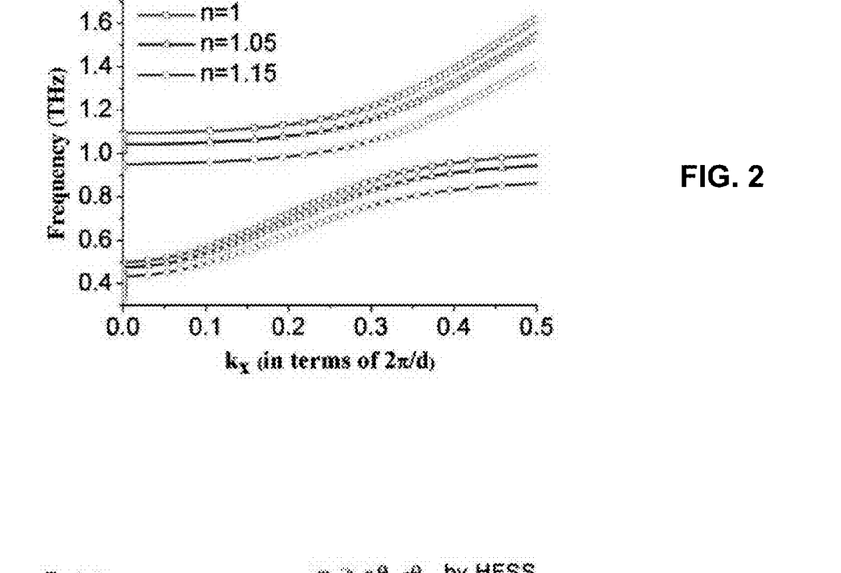
FIG. 2 is a graph depicting dispersion relation of a single-armed DC-SSPP structure when filled with dielectric material of different refractive indices.

The wave vectors as mentioned above are functions of refractive index n of the dielectric material. Therefore, when a modulation on n is somehow introduced, it is possible to modulate the wave vector, hence the phase accumulation of the THz wave traveling within the structure. As an example, the dispersion relationship of one example DC-SSPP structure $$\left(d = 100 \text{ µm}, \frac{a}{d} = 0.1, \frac{h}{d} = 0.8, \frac{t}{d} = \frac{1}{3}, W = 300 \text{ µm}\right)$$

calculated from (9) using MATLAB is shown in FIG. 2. The waveguide is made of dielectric materials having three different refractive indices $n_0=1$, $n_1=1.05$ and $n_2=1.15$, In the figure the dispersion curve is seen to be significantly lowered when higher refractive index material is used.

A natural result of this modified dispersion relations is the difference in phase accumulations when signals on the order of one terahertz propagate through such DC-SSPP structures with different dielectric constant. While specific reference is made to terahertz signals, it is understood that the MZI structure is applicable to signals having different frequencies, for example ranging from 100 GHz to 30 THz.

Figure 3:
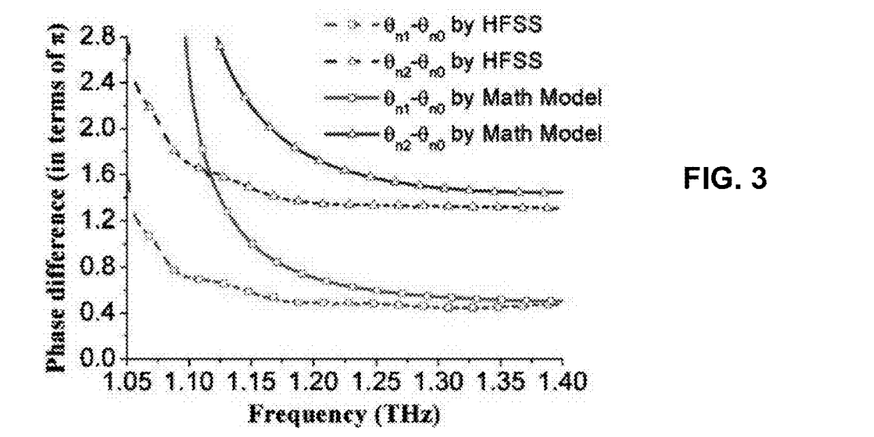
FIG. 3 is a graph depicting a difference in phase accumulation for terahertz signal as a function of frequency between three refractive indices as obtained using the analytical model and HFSS simulations.

In FIG. 3, the phase difference of THz signals is shown after it travels through seven periods of the DC-SSPP waveguide with three refractive indices ($n_0=1$, $n_1=1.05$ and $n_2=1.15$). The solid lines represent the result obtained from our mathematical model and the dashed lines show the simulation results obtained using HFSS software. It is observed that the two curves are close to each other with frequencies far from the SSPP resonance. Near the band-gap region, despite the observable disparities, both curves show a sharp increase of the phase difference, as is predicted from FIG. 2 with flattened dispersion curves.

The two curves have a diverging discrepancy near the band-gap, to which various reasons may apply. The main factor contributing to the difference is the edge effect, which signifies the distorted strong E-M field around the edges of the grooves near resonance. Under such circumstance, the waveguide cannot be accurately described as the combination of the distinctive Region I and Region II, which can give rise to errors in the analytical calculation. Previous works have studied the same structure using both analytical models and CST simulation software. Between two approaches a difference of ~0.07 THz in resonance frequency is demonstrated. Such number agrees with the results we obtained here.

Another basic difference in the two approaches is the assumption of an infinite waveguide in the mathematic model, whereas in HFSS simulation the structure must have a finite length in the propagation direction. To study the effect of the latter, similar structures were simulated with different number of periods up to 20 grooves. The results demonstrate close to linear change of the signal phase delay and no significant alleviation of the discrepancy with the increase in the waveguide length, therefore ruled out its contribution to such disparities. Hence, consider the SSPP waveguide with as few as 7 grooves to be effectively periodic, and use it as the basic building block for the MZI structures throughout this disclosure. It is readily understood, however, that more or less grooves in MZI structures can be used.

Frequency filters as well as switches have been designed with single-armed DC-SSPP waveguide since it has been demonstrated to have frequency selective transmission curves. Such designs, however, only take advantage of the transmission selectivity of the DC-SSPP waveguide, and usually suffer from the broad peaks of their transmission curves before it can achieve better frequency resolution and sensitivity. When phase modulation by changing refractive index n is demonstrated as above, two arms of DC-SSPP waveguides can be combined to form an MZI. The THz signal from two arms of the MZI, when recombined after they propagate through different dielectric materials will be either enhanced or reduced in magnitude as a result of coherent interference. The combined effect of the selectivity of single-armed DC-SSPP waveguide and that of the interferometer will result in a transmission curve with sharper features as well as better sensitivity to structural variations caused by external modulations.

Figure 4:
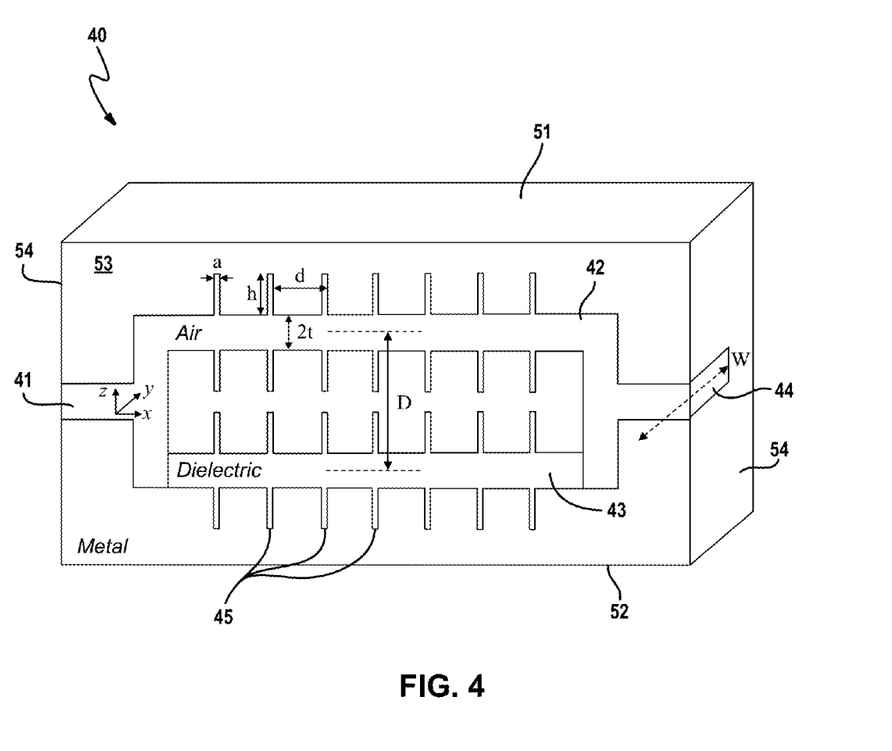
FIG. 4 is a cross-sectional view of a Mach-Zehnder Interferometer with different geometric dimensions labeled.

FIG. 4 depicts an example Mach-Zehnder interferometer 40. The interferometer 40 is comprised of an input channel 41, an output channel 44 and two arms (or channels) 42, 43 interconnected between the input channel 41 and the output channel 44. The input channel is configured to receive electromagnetic (E-M) waves traveling at a given frequency, for example on the order of a terahertz. The two arms 42, 43 extend from the input channel in parallel with each other. The two arms 42, 43 are configured to guide spoofed surface plasmon polariton (SSPP) waves from the input channel 41 to the output channel 44, where the spoofed surface plasmon polariton waves propagate at a speed slower than the input EM wave. In one embodiment, the two arms 42, 43 may be configured with a plurality of grooves 45 as further described below. The output channel 44 receives the SSPP waves from each of the two arms 42, 43 and emits an interference wave formed from the SSPP waves.

In one embodiment, the interferometer is comprised of a metal structure in the shape of a rectangular cuboid defining a top surface 51, a bottom surface 52, two side surfaces 53 and two opposing end surfaces 54. The input channel 41 extends inwardly from one end surface 54, and the output channel extends inwardly from the other end surface 54. It is envisioned that the metal structure as well as the channels defined therein can take on other shapes.

A plurality of grooves is formed at periodic intervals along the inner surface of both two arms. In the upper arm 42, a first subset of grooves extend towards the top surface of the metal structure while a second subset of grooves extend towards the lower arm 43 and the bottom surface of the metal structure. In the lower arm 43, a first subset of grooves extend towards the upper arm 42 and the top surface of the metal structure while a second subset of grooves extend towards the bottom surface of the metal structure.

Figure 5A:
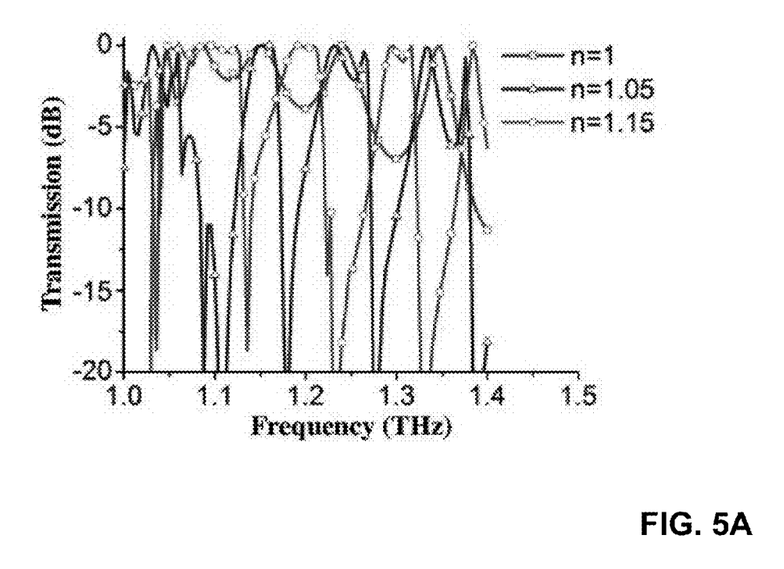
FIGS. 5A and 5B are graphs depicting the transmission spectrum of the Mach-Zehnder Interferometer and the single-armed DC-SSPP structure, respectively.
Figure 5B:
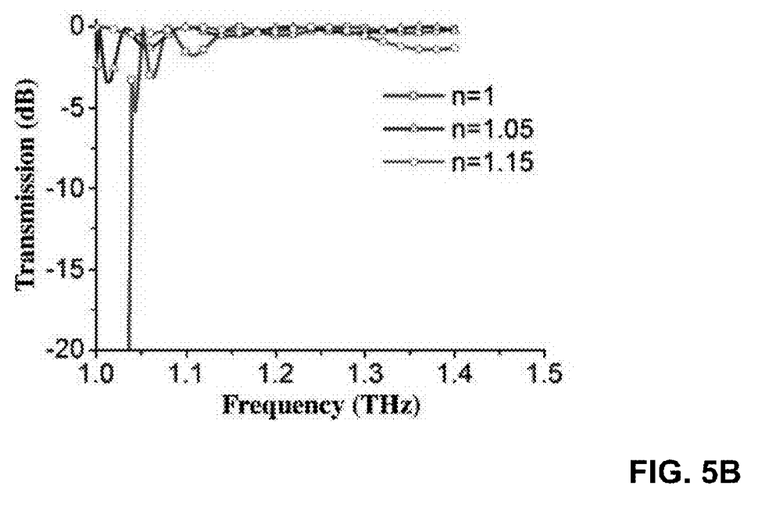

Various dimensions are labeled in the figure, with D denoting the distance between the two waveguide arms. The first structure simulated has the dimensions of d=100 µm, a/d=0.1, h/d=0.8, t/d=1/3, W=300 µm, and D=250 µm, and each arm consists of a DC-SSPP waveguide with 7 grooves. With three different dielectric materials filling up one of the arms and air ($n_0=1$) filling up the rest of the structure, the transmission curves of the MZI are shown in FIG. 5A. For comparison, the transmission curves of the single arm DC-SSPP structure of the same dimensions are shown in FIG. 5B.

It is quite obvious that by introducing MZI structure on top of the DC-SSPP waveguide, the spectral features on the transmission curves are greatly enhanced. Above the first band-gap, single-armed waveguide barely shows any suppression of the transmitted signal beyond 5 dB, while the distinction between the pass and the stop bands of the MZI structure is quite significant. The peaks and valleys of the transmission curves of the single-armed waveguide, and those of the MZI structure with $n_0=1$ (i.e., when both arms are filled with air) come from the Fabry-Perot etalon effect. While the F-P ripples are caused only by the periodicity of the grooves for the single-armed waveguide, for MZI structure they also come from multiple reflections from the walls that bounds the interferometer.

In FIG. 5A, there are several frequencies where the MZI structure demonstrates distinct ON/OFF states when different dielectric materials are loaded. Some of those frequencies, along with the magnitude of transmission (T) and the phase difference, as predicted in FIG. 3, are listed in Table I.

TABLE I

TRANSMISSION (IN dB) AND PHASE DIFFERENCE AT SOME FREQUENCIES FOR THE DC-SSPP MZI STRUCTURE

| Frequency | 1.084 THz | 1.152 THz | 1.240 THz | 1.348 THz |
| --- | --- | --- | --- | --- |
| T when n = 1 | −0.03 dB | −0.01 dB | −0.03 dB | −0.03 dB |
| T when n = 1.05 | −10.25 dB | 0.00 dB | −0.78 dB | −3.79 dB |
| $\Delta\phi: n_1 - n_0$ | $0.824\pi$ | $0.571\pi$ | $0.486\pi$ | $0.453\pi$ |
| T when n = 1.15 | −0.10 dB | −6.20 dB | −18.18 dB | −15.11 dB |
| $\Delta\phi: n_2 - n_0$ | $1.873\pi$ | $1.473\pi$ | $1.334\pi$ | $1.319\pi$ |

By correlating the transmission with the phase difference, it is observed that significant suppression of the THz signal tends to happen when the phase difference between two arms of the interferometer is close to odd numbers of $\pi$. One may notice that in Table I, the transmission peaks and valleys do not correspond perfectly to integers of $\pi$ in phase difference. This mismatching is attributed partly to the fact that the transverse mode profile from two arms of the MZI structure is different when different materials are loaded, therefore their maximum enhancement or cancellation is shifted from the frequency otherwise predicted. The more complicated geometry of the interferometer also contributes to the disparity, when mode deflection on the additional walls and material interfaces cannot be neglected. Nonetheless, in FIG. 3, if the phase difference between two arms is compared in the cases of $n_1=1.05$ and $n_2=1.15$ (lines with square and triangle markers respectively), an almost constant difference of $\pi$ is observed. This is consistent with the simulation results that the transmission peaks and valleys in the two cases are almost always inversed.

Figure 6A:
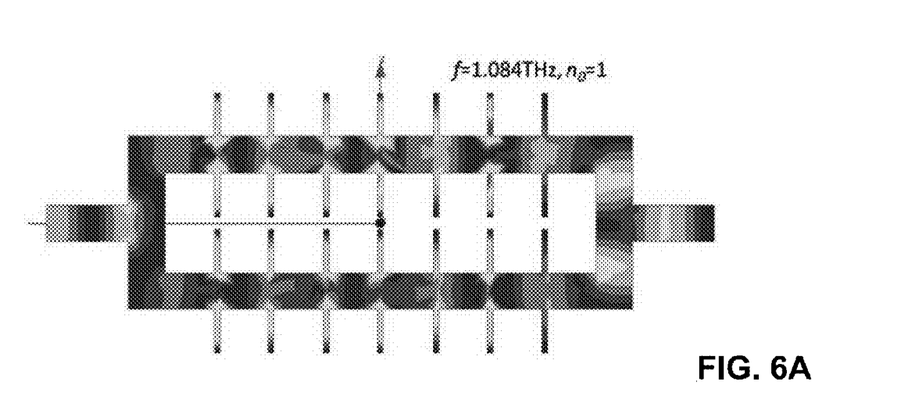
FIGS. 6A-6C are illustrating of example electric field distribution in the DC-SSPP MZI structure for three different refractive indices, respectively.
Figure 6B:
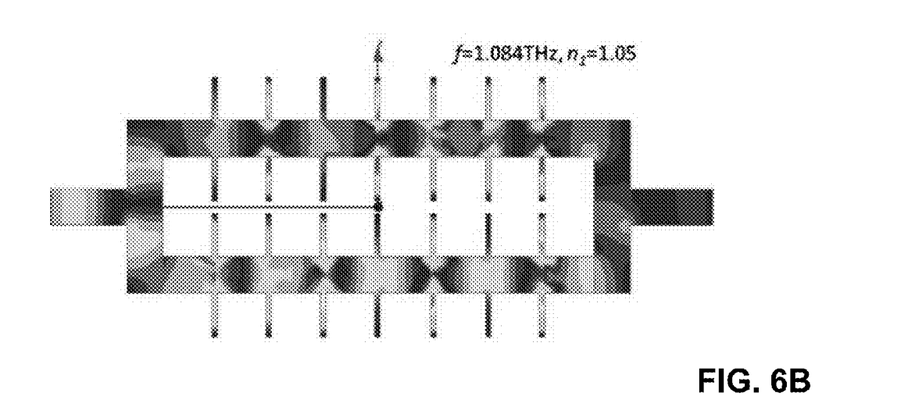
Figure 6C:
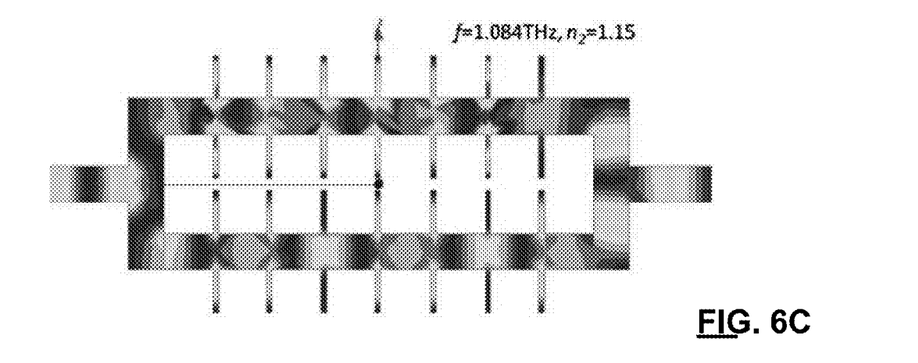

In FIG. 6, the E field distributions are shown on the cross section of the structure at the frequency of f=1.084 THz. The constructive/destructive interference between the two arms in different cases can be clearly seen. It is noticed that for frequencies close to the SSPP resonance, the E-M field is greatly localized in the groove region of the structure. It is consistent with the theoretical analysis, where a strongly confined energy distribution of the THz wave is predicted near resonance. This property indicates the possibility of using less amount of dielectric loading to achieve the same selectivity of the structure, which will be discussed more in detail later.

Figure 7A:
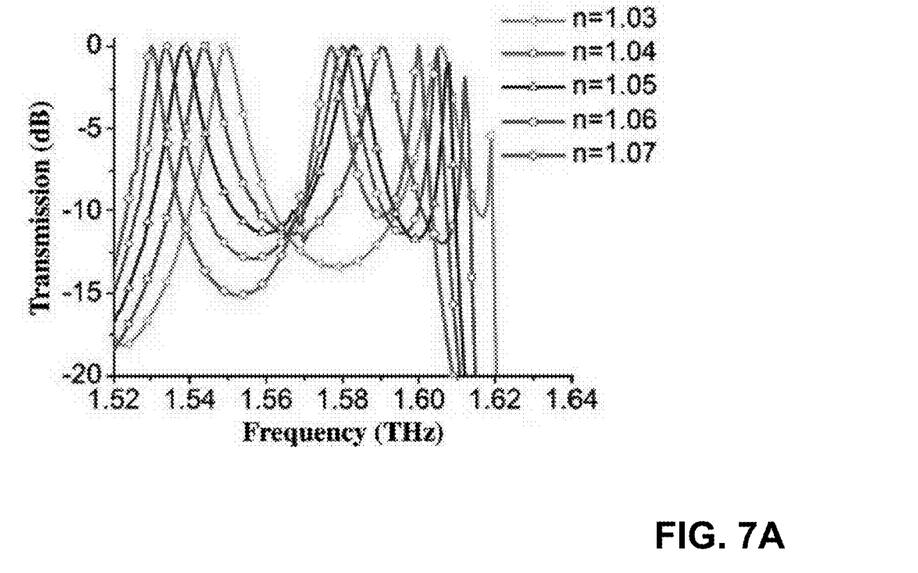
FIGS. 7A and 7B are graphs depicting the transmission spectrum of the Mach-Zehnder Interferometer and the single-armed DC-SSPP structure, respectively.

The enhancement to the ON/OFF ratio is beneficial for switching and sensing applications. In addition, the MZI DC-SSPP structure can in general produce sharper transmission peaks, which are desired in high spectral resolution THz detector designs. To better illustrate this property, simulation was done on a second MZI DC-SSPP structure with dimensions of $$\left(d = 100 \ \mu m, \frac{a}{d} = 0.1, \frac{h}{d} = 0.8, \frac{t}{d} = \frac{1}{3},\right)$$

W=300 µm, and D=250 µm. In FIG. 7A, the transmission spectrum of this structure is shown as obtained by HFSS simulations with a number of different dielectric material loadings. As an example, with n=1.05 filling up one of the arms, the Q-factor for the first peak shown in the figure is estimated to be ~400 and that for the third peak to be ~1300, Such peaks with high quality factor can be used as frequency filters when the detection of narrow spectral features is desired for certain applications.

Figure 7B:
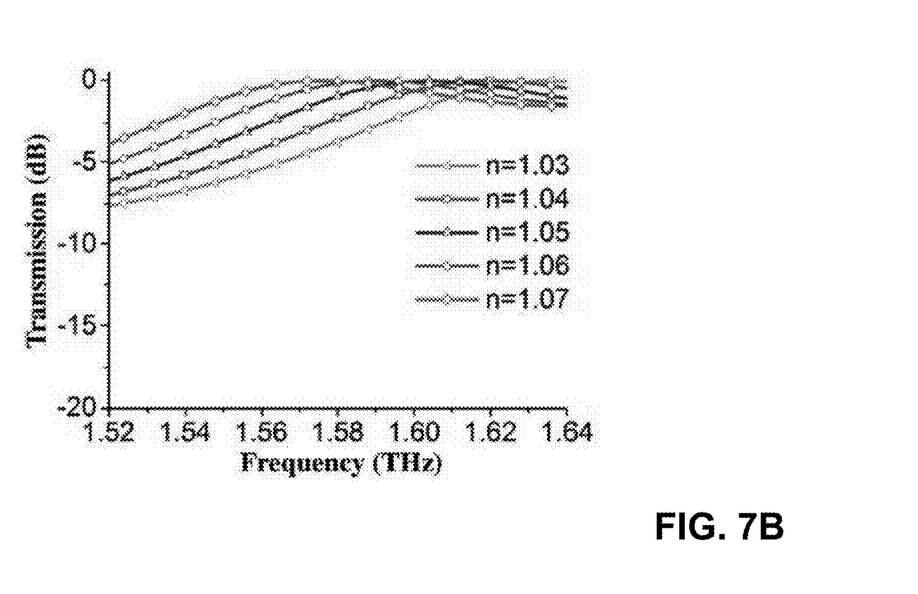

It is also noticed that in this case, for the first peak a complete shift from ON to OFF state, with a contrast of 15 dB at f=1.548 THz, can be induced by a refractive index change of 0.04, If the third peak is considered, such switching of state with an extinction ratio exceeding 20 dB can be achieved for a refractive index change of merely 0.01 (for example, at f=1.612 THz with n=1.05 and n=1.06). As a comparison, the transmission curves for the single-armed waveguide with same dimensions are presented in FIG. 7B. Contrastingly, the flatness of those transmission spectra would prevent it from being useful in any frequency sensitive detector designs or THz switching components alike.

When compared with the original design of a single-armed waveguide, the SSPP band-gap structure combined into an interferometer has resulted in sharper peaks in transmission curves, as well as higher sensitivity to refractive index changes of its dielectric loading. Those properties can be potentially applied to sensor designs. One example is the genetic diagnosis, usually referred to as the DNA biosensors, where the aim is to recognize the sequence of unknown polynucleotide by binding it with single-stranded "probe" DNA molecules with known sequences. The detection of the density of binding event is essential, since strong conjugation only happens between complementary base sequences.

Traditionally, the conformational change from the single-stranded ("denatured") DNA to the double-stranded ("hybridized") DNA molecules are tracked by tagging the target DNA with certain fluorescent agent. Despite its widespread use, this method suffers from numerous disadvantages such as the unwanted interference from the tagging agent, the fluorophore degradation and the extra preparatory steps, which are time consuming. On the contrary, the hybridization event of DNA is shown to be able to shift the characteristic vibrational resonance (usually in THz frequencies) of the molecules, therefore inducing a change in its refractive index. By detecting such refractive index change using probe THz beams, the intensity of the hybridization can be quantitatively determined.

This idea of tag-free sensing of DNA molecules overcomes the disadvantages of the fluorescence-based sensing schemes, and has been shown to be effective. In some pioneering studies by other researchers, THz time domain spectroscopy (THz-TDS) is combined with various frequency selective structures in order to detect the spectral shift induced by the hybridization event. In this disclosure, it is proposed to use the DC-SSPP MZI structure to detect directly the change in refractive index in the sample loading.

In the simulations discussed above, the refractive indices of the dielectric loading were selected to be $n_0=1$, $n_1=1.05$ and $n_2=1.15$, They represent the dielectric properties of air, denatured DNA and hybridized DNA respectively, according to previous experimental measurements of these samples in THz frequency domain. As demonstrated earlier, the MZI structure produces transmission peaks that are quite distinguishable between the three dielectric loadings. By choosing the right probe frequency, it is very straightforward to identify the different bio-molecules if they exist in the sample loadings.

The field distributions as shown in FIG. 6 demonstrate strong localization of the THz signal near the groove region of the structure, when the frequency is close to resonance. This indicates strong interaction of the dielectric material with the probe THz signal near the grooves. It is therefore possible to reduce the amount of sample usage without harming the sensitivity of the MZI structure, by localizing the DNA molecule loadings to the groove area. For that purpose, the MZI DC-SSPP structure is simulated with dimensions of $$\left(d = 100 \text{ μm}, \frac{a}{d} = 0.1, \frac{h}{d} = 0.8, \frac{t}{d} = \frac{1}{3},\right)$$

Figure 8:
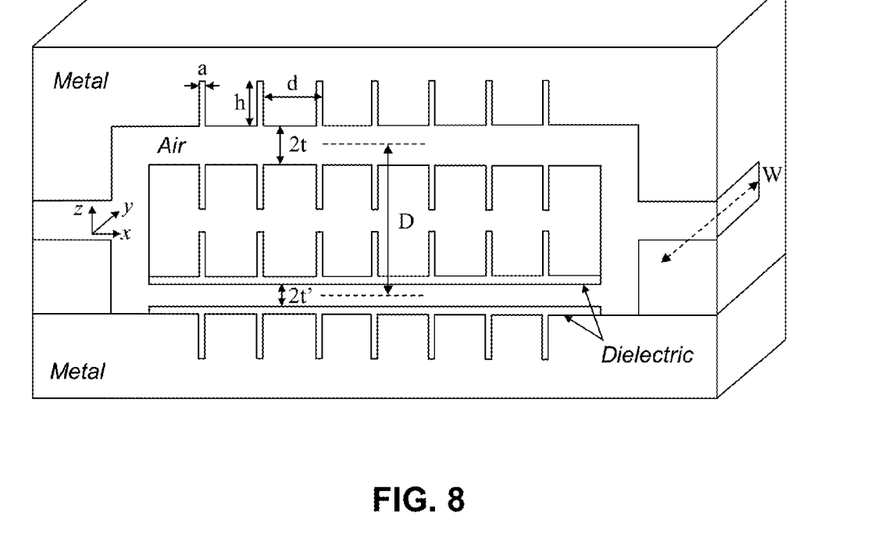
FIG. 8 is a cross-sectional view of a Mach-Zehnder Interferometer with different geometric dimensions labeled.
Figure 9:
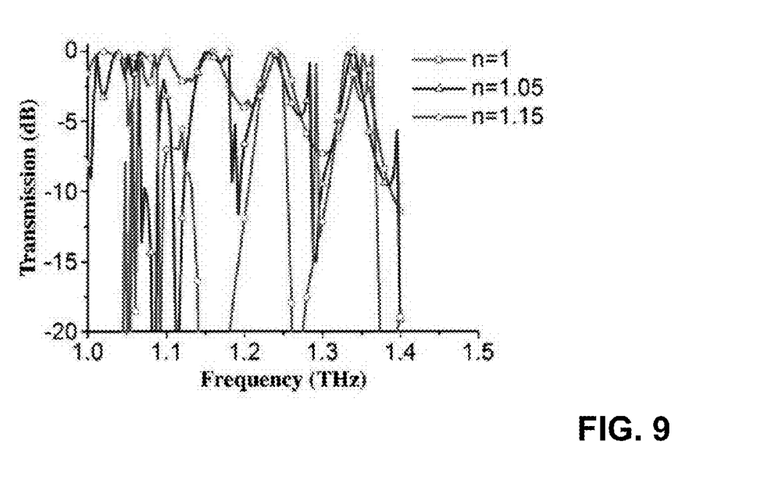
FIG. 9 is a graph depicting the transmission spectrum of the Mach-Zehnder Interferometer with localized sample loadings Corresponding reference numerals indicate corresponding parts throughout the several views of the drawings.

$W=300$ μm, and $D=250$ μm, this time with only the grooves plus a thin layer on each wall $$\left(\text{with } \frac{t'}{d} = 0.2\right)$$

loaded with DNA samples as shown in FIG. 8. The simulation result is shown in FIG. 9, and the magnitudes of transmission for the same set of frequencies are summed up in Table II.

TABLE II

TRANSMISSION (IN dB) AT SOME FREQUENCIES FOR THE DC-SSPP MZI STRUCTURE, WITH LOCALIZED LOADING OF DNA SAMPLES NEAR THE GROOVE REGION

| Frequency | 1.084 THz | 1.152 THz | 1.240 THz | 1.348 THz |
|---|---|---|---|---|
| T when n = 1 | −0.35 dB | −0.19 dB | −0.24 dB | −2.30 dB |
| T when n = 1.05 | −39.2 dB | 0.00 dB | −0.24 dB | −1.71 dB |
| T when n = 1.15 | −0.21 dB | −21.36 dB | 0.00 dB | −3.38 dB |

From both FIG. 9 and Table II, it is observed that when the frequency is close to resonance (f=1.084 THz and 1.152 THz for example), the difference in ON/OFF state as induced by different sample loadings still exists and is consistent with the cases in Table I. However with frequencies far away from the resonance, the difference in phase accumulation with different sample loadings will not be significant due to the delocalization of the E-M field, resulting in the mostly coinciding transmission peaks. This way, it is demonstrated that the spectral sensitivity of the MZI DC-SSPP structure to the refractive index change is not harmed by the localized loading of the dielectric sample near the groove region, should the probe frequency be close to the SSPP resonance. When compared with the full loading case, the amount of sample needed in this case can be reduced by as much as 50%.

In another embodiment, the sensor based on MZI SSPP structure can be constructed with two modules as shown by the different shading of the metal in FIG. 8. With the localized sample loading proved to be effective, the DNA preparation and immobilization process can be performed separately on the two modules of the sensor before they can be combined in a flip-chip manner and ready for test. Similar idea of the modular design has been implemented by other groups and its effectiveness has been demonstrated. Such design is the key for disposable sensor constructions and can greatly reduce the running cost of the technique.

A MZI structure consisting of two arms of DC-SSPP waveguide is presented in this disclosure. By combining the spectral response of the DC-SSPP structure and the interference effect of the MZI, the frequency selectivity is greatly enhanced in terms of both the ON/OFF switching ratio and the quality factor of the transmission peaks. Both mathematical modeling and elaborate simulation using HFSS software are shown to agree with each other reasonably well despite the existence of observable discrepancies near the SSPP resonance.

It is shown that the THz MZI DC-SSPP structure can be deployed in bio-molecular sensing. By using a probe THz beam with the correct frequency it is possible to distinguish between denatured DNA and hybridized DNA by detecting the change of their refractive indices. The strongly localized E-M field distribution of the structure also enables us to reduce the usage of bio-molecular samples. By depositing the sample loadings specifically near the groove region, the same spectral selectivity remains near the SSPP resonance frequency when compared with the fully-loaded case.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A Mach-Zehnder interferometer, comprising:
    an input configured to receive an input electromagnetic (E-M) wave having a frequency on the order of one terahertz;
    a first arm extending from the input and configured to guide a spoofed surface plasmon polariton (SSPP) wave therethrough, where the SSPP wave propagates at a speed slower than the input E-M wave;
    a second arm extending from the input in parallel with the first arm and configured to guide a spoofed surface plasmon polariton (SSPP) wave, where the SSPP wave propagates at a speed slower than the input E-M wave and the refractive index of the first arm differs from the refractive index of the second arm; and
    an output configured to receive the SSPP waves from each of the first arm and the second arm and form an interference wave therein.

2. The interferometer of claim 1 wherein the input, the first arm, the second arm and the output are comprised of dielectric material encased in metal, thereby forming an interface along which the SSPP waves travel.

3. The interferometer of claim 2 wherein the first arm is comprised of a dielectric material having a refractive index that differs from the dielectric material comprising the second arm.

4. The interferometer of claim 3 wherein dielectric material in the first arm can be tailored to change the refractive index.

5. The interferometer of claim 3 wherein the first arm includes a plurality of grooves formed along a longitudinal dimension at a periodic interval from each other and the second arm includes a plurality of grooves formed along a longitudinal dimension at the same periodic interval from each other.

6. The interferometer of claim 5 wherein the grooves formed in the first and second arms have a width and a height, such that a ratio between the width of a groove and the periodic interval between grooves is on the order of 0.1 and a ratio between the height of a groove and the periodic interval is on the order of 0.5.

7. The interferometer of claim 6 wherein the first arm is formed with a thickness such that a ratio between the thickness and the periodic interval is on the order of one third.

8. The interferometer of claim 5 wherein the height of the grooves is inversely proportional to the resonant frequency of the SSPP waves.

9. The interferometer of claim 3 further comprises a detector configured to receive the interference wave from the output and determine a phase change in the interference wave in relation to the input E-M wave.

* * * * *